United States Patent
Eggleston et al.

(10) Patent No.: US 9,680,757 B2
(45) Date of Patent: *Jun. 13, 2017

(54) SYSTEM AND METHOD FOR MANAGEMENT OF CLOUD-BASED SYSTEMS

(71) Applicant: DeepField Networks, Inc., Ann Arbor, MI (US)

(72) Inventors: Joseph E. Eggleston, Ann Arbor, MI (US); Craig H. Labovitz, Ann Arbor, MI (US)

(73) Assignee: Deepfield Networks Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,737

(22) Filed: Oct. 26, 2015

(65) Prior Publication Data

US 2016/0043956 A1 Feb. 11, 2016

Related U.S. Application Data

(63) Continuation of application No. 13/760,780, filed on Feb. 6, 2013, now Pat. No. 9,172,591.

(Continued)

(51) Int. Cl.
*H04L 12/26* (2006.01)
*H04L 12/24* (2006.01)
(Continued)

(52) U.S. Cl.
CPC .......... *H04L 47/2441* (2013.01); *H04L 41/00* (2013.01); *H04L 41/12* (2013.01);
(Continued)

(58) Field of Classification Search
CPC ..... H04L 12/24; H04L 41/00; H04L 41/0631; H04L 12/2874; H04L 26/02; H04L 43/00;
(Continued)

(56) References Cited

U.S. PATENT DOCUMENTS 6,073,174 A * 6/2000 Montgomerie ......... G06F 15/17
379/106.03
6,088,659 A * 7/2000 Kelley ................... G01D 4/004
340/870.02

(Continued)

*Primary Examiner* — Sargon Nano
(74) *Attorney, Agent, or Firm* — Wolf, Greenfield & Sacks, P.C.

(57) ABSTRACT

System and method for reporting usage of a network infrastructure includes obtaining a map that includes at least one flow-mapping that correlates a flow feature with a service and that correlates a flow feature with an endpoint type, wherein the endpoint types include at least a subscriber type and a service type; at a first computer, receiving flow telemetry of a network infrastructure, the flow telemetry representing at least the destination and source attributes for network traffic in the flow telemetry; categorizing the flow telemetry into at least a subscriber flow category based on the source and destination endpoint types of the traffic; for subscriber flow telemetry of a subscriber, processing the subscriber flow telemetry into at least one flow feature; identifying at least one service to attribute to at least a portion of the subscriber flow telemetry, the service identified through the processed flow feature and a flow-mapping.

20 Claims, 11 Drawing Sheets

Related U.S. Application Data

(60) Provisional application No. 61/655,278, filed on Jun. 4, 2012, provisional application No. 61/595,243, filed on Feb. 6, 2012.

(51) Int. Cl.
*H04L 12/851* (2013.01)
*H04L 12/801* (2013.01)
*H04L 29/08* (2006.01)

(52) U.S. Cl.
CPC ........ *H04L 41/508* (2013.01); *H04L 41/5009* (2013.01); *H04L 43/026* (2013.01); *H04L 43/062* (2013.01); *H04L 43/0882* (2013.01); *H04L 47/10* (2013.01); *H04L 67/10* (2013.01)

(58) Field of Classification Search
CPC ............... H04L 43/045; H04L 41/0853; H04L 41/5009; H04L 43/026; H04L 43/062; H04L 47/10; H04L 47/2441; G06F 11/3447
See application file for complete search history.

(56) References Cited

U.S. PATENT DOCUMENTS

| | | | | |
|---|---|---|---|---|
| 6,275,695 | B1 | 8/2001 | Obhan | |
| 6,434,391 | B1* | 8/2002 | Rutan | H04W 84/025 340/7.21 |
| 6,564,051 | B2* | 5/2003 | Struhsaker | H01Q 1/246 455/423 |
| 6,681,249 | B2* | 1/2004 | Christensen | G06F 11/3447 709/223 |
| 6,948,000 | B2* | 9/2005 | Desai | H04L 12/2801 348/E7.049 |
| 6,954,641 | B2* | 10/2005 | McKenna | H04W 8/26 455/411 |
| 7,277,416 | B1* | 10/2007 | Chang | H04L 29/12311 370/328 |
| 7,397,388 | B2* | 7/2008 | Huang | E21B 47/182 166/373 |
| 7,490,073 | B1* | 2/2009 | Qureshi | G06N 5/048 706/50 |
| 7,969,306 | B2* | 6/2011 | Ebert | G06K 17/00 340/539.11 |
| 8,730,823 | B2* | 5/2014 | Mohammed | H04L 12/1407 370/242 |
| 9,077,760 | B2 | 7/2015 | McKeown et al. | |
| 9,172,591 | B2 | 10/2015 | Eggleston et al. | |
| 2002/0112053 | A1 | 8/2002 | Christensen et al. | |
| 2004/0060073 | A1 | 3/2004 | Bialk et al. | |
| 2004/0077347 | A1* | 4/2004 | Lauber | G08G 1/0962 455/428 |
| 2004/0230868 | A1 | 11/2004 | Sabet et al. | |
| 2004/0261116 | A1 | 12/2004 | McKeown et al. | |
| 2005/0021766 | A1 | 1/2005 | McKeowen et al. | |
| 2005/0027851 | A1 | 2/2005 | McKeown et al. | |
| 2005/0152300 | A1 | 7/2005 | Edsberg | |
| 2008/0137823 | A1* | 6/2008 | Abichandani | H04L 12/66 379/106.01 |
| 2010/0226282 | A1 | 9/2010 | Aitken | |
| 2011/0103374 | A1 | 5/2011 | Lajoie | |
| 2011/0295983 | A1* | 12/2011 | Medved | H04L 45/00 709/220 |
| 2012/0190386 | A1* | 7/2012 | Anderson | G01C 15/04 455/456.3 |
| 2012/0327787 | A1 | 12/2012 | Mohammed et al. | |
| 2013/0144939 | A1* | 6/2013 | Prahlad | H04L 67/42 709/203 |
| 2013/0204997 | A1 | 8/2013 | Eggleston et al. | |
| 2016/0020964 | A1 | 1/2016 | Eggleston et al. | |

\* cited by examiner

SYSTEM AND METHOD FOR MANAGEMENT OF CLOUD-BASED SYSTEMS

CROSS-REFERENCE TO RELATED APPLICATIONS

This application is a continuation of U.S. patent application Ser. No. 13/760,780, filed Feb. 6, 2013, entitled "System and Method for Management of Cloud-Based Systems," which claims the benefit of U.S. Provisional Patent Application No. 61/595,243, filed Feb. 6, 2012, entitled "System and Method for Management of Cloud-Based Systems," and U.S. Provisional Application No. 61/655,278, filed Jun. 4, 2012, entitled "DNSFLOW—Enabling Netflow-Like Telemetry for DNS," and the disclosures of each of the proceeding applications are incorporated herein by reference in their entirety.

TECHNICAL FIELD

This invention relates generally to the network management field, and more particularly to system and methods for the management of cloud-based systems for enterprises and carriers.

BACKGROUND

With the growth of the Internet for the distribution of commercial and personal information, there is a corresponding growth of the use of large scale distributed computing systems that perform all of the necessary functions. Previously, enterprises were able to manage their own complex internal networks with little concern about any external infrastructure. However, with the onset of cloud-based computing, enterprises no longer have local management control over the bulk of the network infrastructure or architecture. In the era of cloud computing, IT network management, storage, and computing is increasingly dependent upon an entire ecosystem of cloud resources and partners, including managed service providers, public content providers, private cloud operators, public cloud operators, software as a service (SaaS) retailers, infrastructure applications, transit/hardware owners/operators, and of course users and/or customers. The unregulated and decentralized nature of the cloud ecosystem is currently straining enterprises and carriers, who no longer have control over their resources and are no longer able to distinguish between content providers and bandwidth providers. Thus, there is a need in the network management field to create a new and useful system and method for management of cloud-based systems. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System and Operating Environment of the Preferred Embodiment

Figure 1:
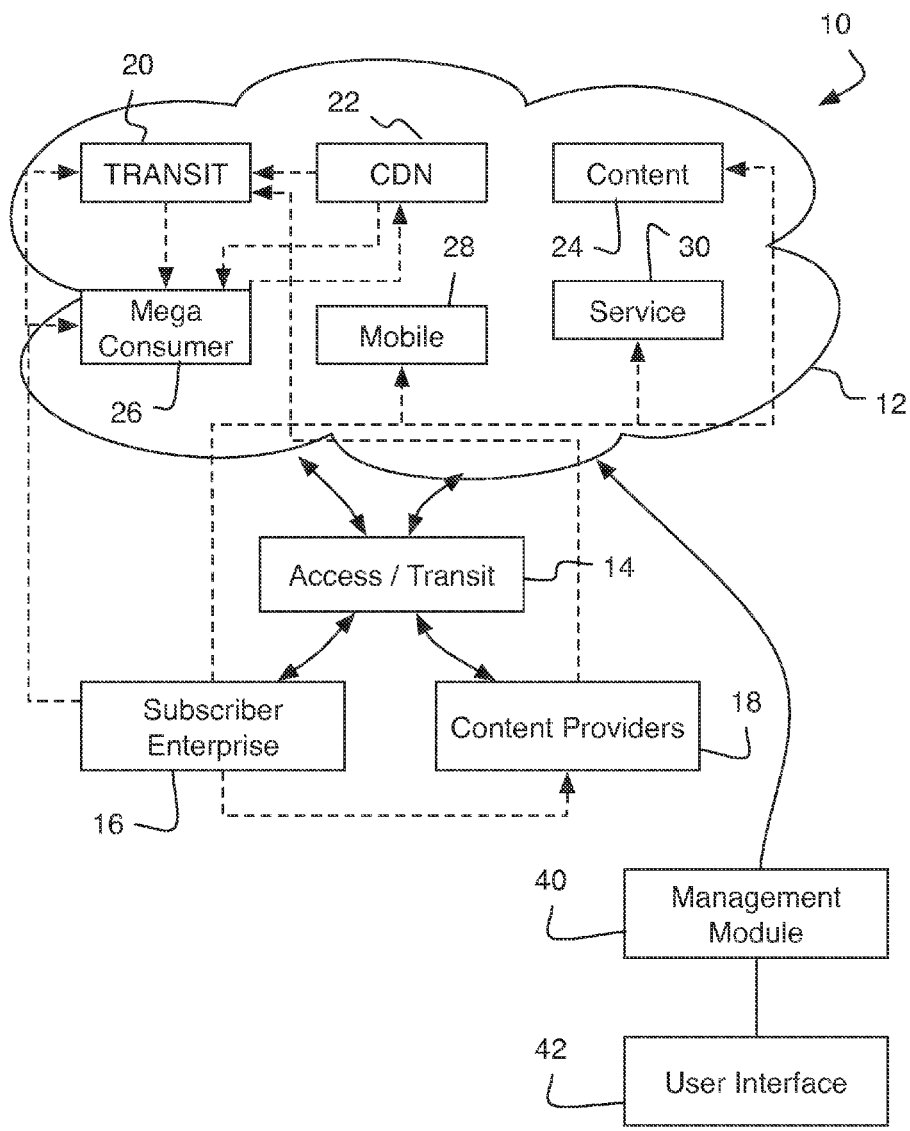
FIG. 1 is a schematic block diagram depicting a system and/or operating environment for management of cloud-based system according to a preferred embodiment of the present invention.

As shown in FIG. 1, a system 10 and/or operating environment of the preferred embodiment can include a cloud system 12 having one or more distributed servers, networks, hosts, transit means, and the like. The system 10 of the preferred embodiment can function at least in part to report on usage of a network infrastructure. More specifically, the system 10 functions to identify the various commercial entities involved in Internet traffic, and in particular those commercial entities that utilize and/or exchange monetary value for bandwidth and content services in a cloud computing environment. An example cloud system 12 can include transit entities 20 such as carriers/carrier network managers, content distribution networks (CDN) 22 such as Akamai and Limelight, content servers 24 such as Facebook and Google, mega-consumers 26 such as cable/Internet providers, mobile service providers 28 such as Orange and Verizon, and other service 30 providers such as Amazon.com, Rackspace and the like. Preferably, the cloud system 12 can be configured to provide services to one or more users (enterprise, personal), including, for example, computational services, software, data storage/access, content distribution, or any other suitable service through a distributed network of servers and data centers. Preferably, the cloud system 12 is further configured for operation/communication according to at least the client/server and peer-to-peer models, such that cloud system 12 resources can be consumed by any number of end users.

As shown in FIG. 1, the system 10 of the preferred embodiment can further include an access/transit service 14 that permits system users, including subscriber/enterprise users 16 and content providers 18, to interface with the cloud system 12. The access/transit service 14 preferably functions as a paid bandwidth provider that permits the communication of data between the users with one another through the cloud system 12. The subscriber/enterprise users 16 can preferably include natural and non-natural person users, including individuals, businesses, associations, universities, hospitals, government agencies, and/or any other potential user having access to one or more services provided through a network. The content providers 18 preferably include any desired content that is hosted and/or communicated through one or more portions of the cloud system 12. Example content providers that are discussed herein include Netflix and Hulu, both of which provide users with access to video content, which in turn can command the usage of significant amounts of cloud system 12 resources.

As shown in FIG. 1, the system 10 of the preferred embodiment can include a large number of interacting entities. It should be noted that some of the discrete blocks shown and described herein, such as subscriber/enterprise users 16, can in fact include millions or potentially billions of individual nodes within the system 10. Each of the other blocks can include potentially large numbers of additional nodes, dramatically increasing the complexity of the cloud system 12. Further complicating the system 10 as shown is that each of the relevant players have complex economic relationships represented by the phantom arrows (payment from one block to another following the trajectory of the arrow). As an example, the transit entities 20 are typically paid from at least the CDNs 22, the subscriber/enterprise users 16, and the content providers 18. The transit entities 20 in turn typically remit payment to the mega-consumer 26, which as shown also typically receives compensation from at least the subscriber/enterprise users 16. As a result, the overall economics of the cloud system 12 are extremely complicated and potentially inefficient given the imprecise allocation of resources to different types of content providers and content consumers.

Figure 2:
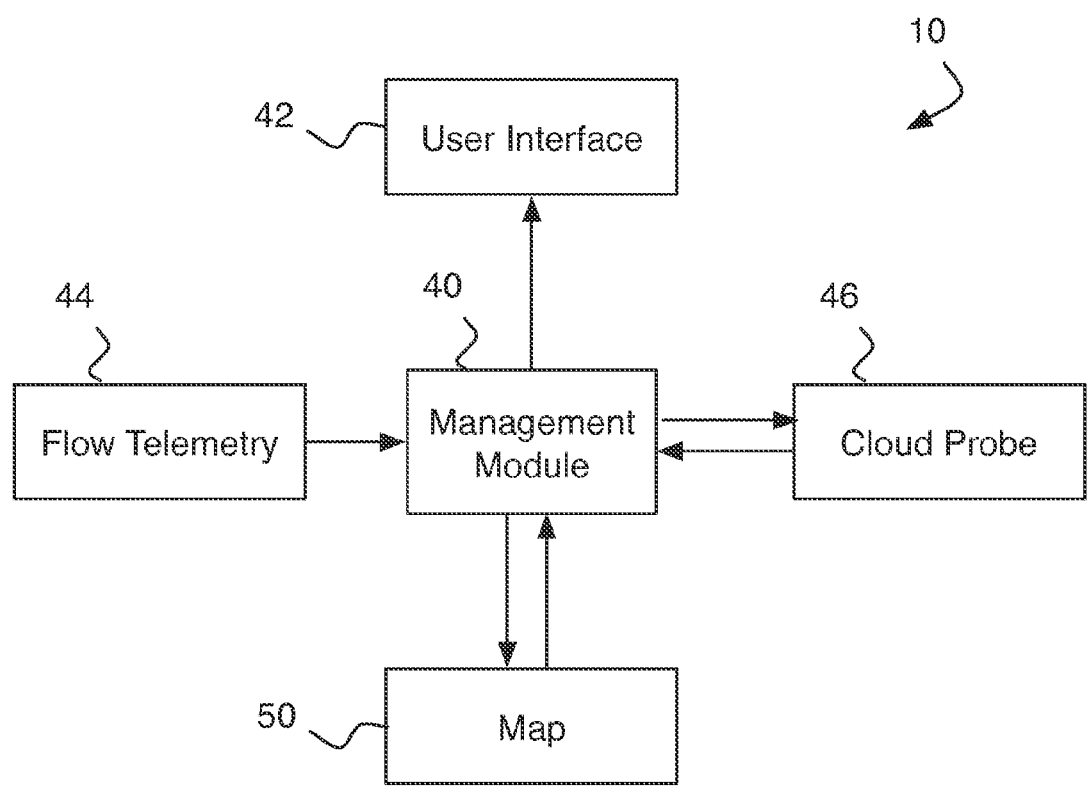
FIG. 2 is a schematic block diagram depicting one or more additional aspects of the system and/or operating environment of the preferred embodiment of the present invention.

Accordingly, as shown in FIGS. 1 and 2, the system 10 of the preferred embodiment can include a management module 40 in communication with the cloud system 12. The management module 40 of the system of the preferred embodiment can function to perform, at least in part, one or more of the methods of the preferred embodiment described in detail below. In particular, the management module 40 preferably functions to interact with the cloud system 12 in order to categorize, characterize, detect, describe, analyze, and/or present the traffic patterns, service providers, consumers, and allocation of resources within the cloud system 12. Preferably, the management module 40 can be connected to and/or integrated with an analytics interface 42, which functions to allow a user to observe, direct, and/or inform the interaction between the management module 40 and the cloud system 12. Preferably, the analytics interface 42 can include at least a display and a keyboard, mouse, and/or touchpad/touch screen to permit a user to direct the operation of the management module 40.

As shown in FIG. 2, the management module 40 of the system 10 of the preferred embodiment can be connected with and/or integral with one or more of the analytics interface 42, a flow telemetry 44, a cloud probe 46 and/or a map module 50. Preferably, the management module 40 can be configured as a standalone hardware/firmware/software package for use by a single entity in analyzing one or more features of the cloud system 12. Alternatively, the management module 40 can be configured as a distributed system or software service (itself potentially disposed in a cloud environment) with which a user interacts through his or her appliance. Accordingly, although the following description and associated FIGURES refer to the management module 40 as receiving inputs from the cloud system 12 and/or directing probes to the cloud system 12, those of skill in the art will appreciate that one or more portions of the management module 40 could be disposed within the cloud system 12. Accordingly, the descriptive terms, verbs, and adjectives used in the present description are for illustrative purposes alone, and should not be construed as limiting the location, configuration, or other disposition of any selected hardware, firmware, or software of the management module 40.

Figure 3:
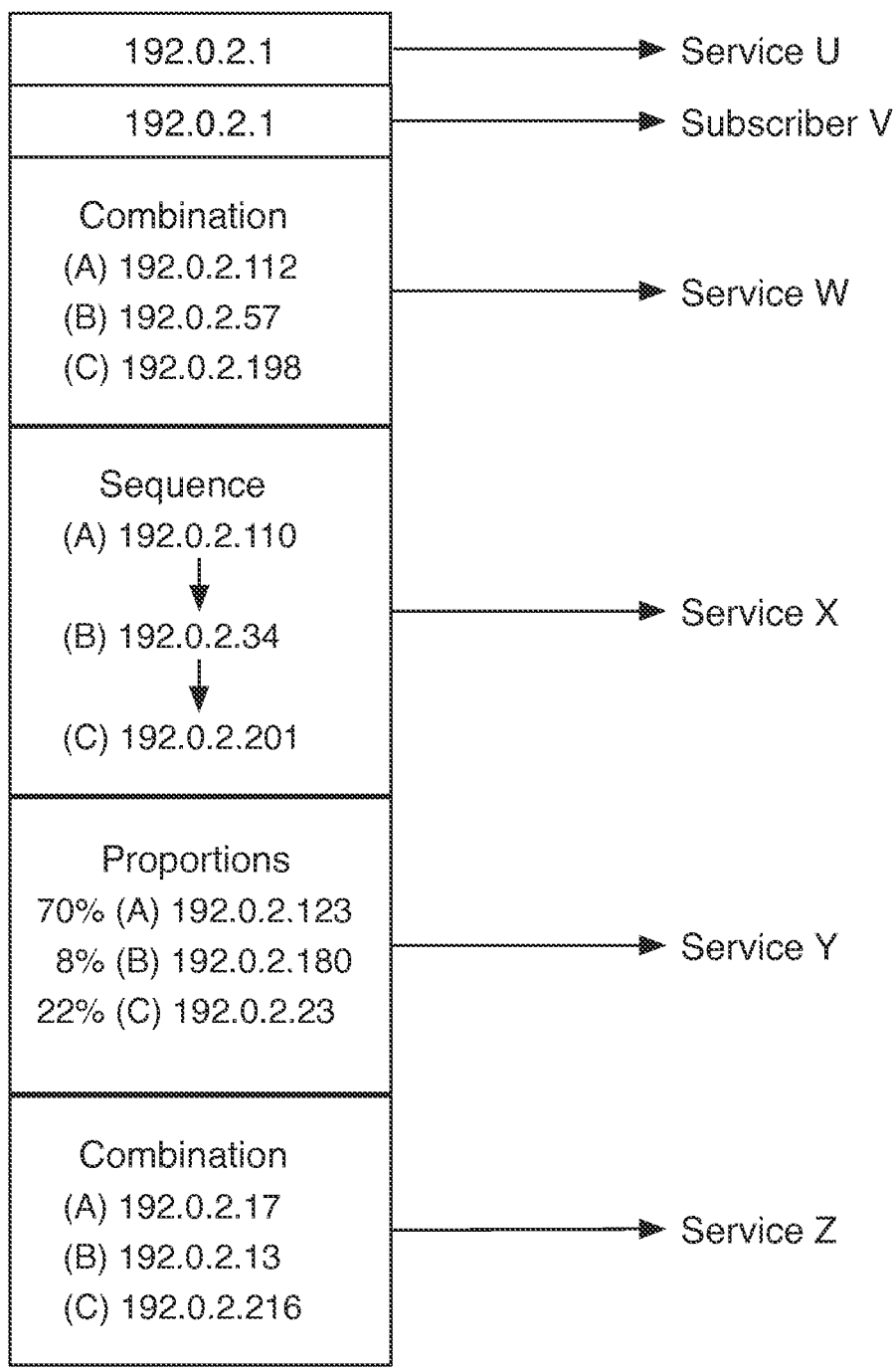
FIG. 3 is a schematic diagram representing exemplary flow-mappings of a map module of a preferred embodiment of the present invention.

As shown in FIG. 2, the management module 40 can receive flow telemetry 44 as an input. The flow telemetry 44 preferably functions to passively and/or actively capture, retrieve, input, and/or receive network communication traffic packets, transmission, connections, or other forms of network bandwidth use indicative of and/or representing one or more attributes of a communication. As an example, routers and switches regularly export flow telemetry 44, which can include header information about the packets being forwarded. Preferably, the header information is exported using one or more known protocols (e.g., NetFlow or IPFIX). The routers and/or switches can preferably be configured to export flow information for some or all traffic. More preferably, the routers and/or switches can be configured to export flow information at a predetermined rate, such that, for example, one out of every 1000 flows is processed by a system 10 of a preferred embodiment. Other aspects and features of the flow telemetry 44 are described in detail below with reference to the methods of the preferred embodiment. Preferably, the management module leverages pattern detection modules to classify network traffic by service, subscriber, and/or any suitable entity. The pattern detection modules are preferably configured to analyze flow telemetry patterns such as component combination, component usage order, mixture of component usage, and other communication patterns to classify network traffic by service, subscriber, or any suitable entity. As shown in FIG. 3, the flow telemetry patterns are preferably characterized into flow-features of flow-mappings. The management module can further process communication with domain name server (DNS) and content delivery network (CDN) components to at least in part refine, identify, or classify flow telemetry As shown in FIG. 2, the system 10 of the preferred embodiment can further include a cloud probe 46 in communication with the management module 40. Preferably, the cloud probe 46 functions to affirmatively interact with one or more aspects of the system 10 described above with reference to FIG. 1. As an example, the cloud probe 46 can include any necessary or desirable hardware, firmware, and/or software configured to transmit one or more types of specified transmissions to one or more aspects of the system 10. Example types of specified transmissions can include reverse DNS queries, traceroute queries, scripts, and any other suitable type of message or communication that causes the service or component recipient to reveal one or more of its domain name, its IP address, one or more components used in its service, or any other suitable or desirable aspect of the flow telemetry. Preferably, the cloud probe 46 receives the requested information from the recipient in the system 10 and delivers the same to the management module 40. As noted above, the cloud probe 46 can be a discrete aspect of the system 10 or it can be integrated into the management module 40.

Figure 11:
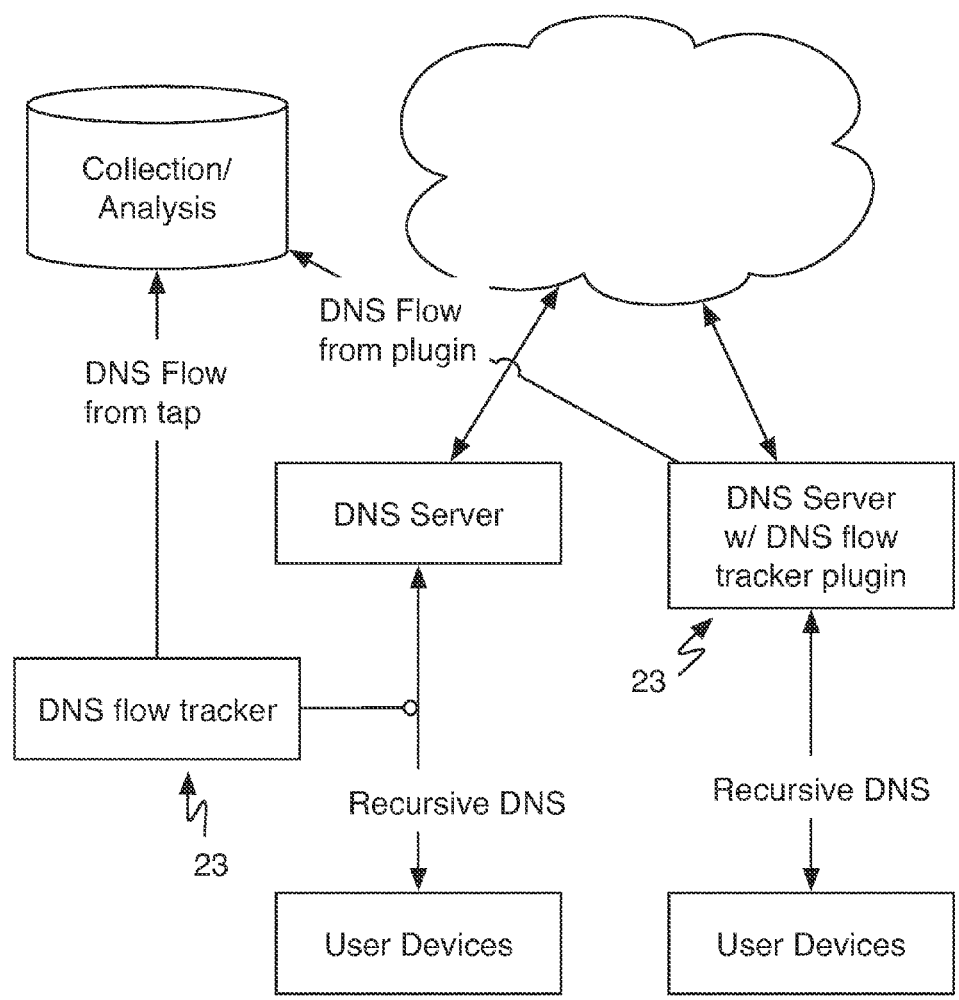
FIG. 11 is a schematic representation of a DNS flow tracker of a system of a preferred embodiment.

In one preferred embodiment, a DNS flow tracker 23 can capture DNS flow telemetry. As shown in FIG. 11, a DNS flow tracker preferably interfaces with DNS queries flow telemetry. In a first variation, the DNS dlow tracker 23 is a server plugin or service that can be integrated into the operation of a DNS server. In another variation, the DNS flow tracker 23 is a DNS telemetry tap that interfaces with network traffic to and/or from a DNS server. A DNS flow tracker 23 preferably collects information along a data plane that can lend DNS-based context to the analysis of data traffic. The DNS flow tracker 23 is preferably configured to track, record, and analyze the mapping of machine addresses (e.g., IP addresses) with domain names. The DNS flow tracker 23 preferably contributes to the map module 50. The mapping of domain names to machine addresses may be classified as substantially static (e.g., rarely change) or substantially dynamic (e.g., mapping changes frequently). Other classifications may additionally be generated. The classifications may be used in providing context to flow telemetry. For example dynamic mappings can be used as a signal flow telemetry from CDNs, massive web hosting systems, or other infrastructures with changing domain to machine mappings.

As shown in FIG. 2, the system 10 of the preferred embodiment can further include a map module 50 in communication with the management module 40. The map module 50 preferably functions to provide an index or table of IP addresses and the respective service/subscriber associated with that IP address. The mapping of an IP address, plurality of IP addresses, characterization of network activity and/or other suitable flow feature (i.e., a property of network communication) to a respective service/subscriber is preferably described as a flow-mapping. The IP addresses may be address space owned by the service or subscriber, address space of CDN servers, Preferably, the map module 50 further functions to assist the management module 40 in determining the allocation of cloud resources by denoting which traffic originates or is directed to various types of services and/or subscribers. For example, the map module 50 can identify servers and/or subscribers by IP address as belonging to a particular service, such as Hulu or Netflix. Additionally the map module 50 can additionally characterize, describe, or otherwise include flow telemetry patterns of a service/subscriber. For example, the map module 50 may store a set of IP addresses of component A, component B, and component C, which when used together indicates the traffic should be attributed to a particular service. The map may additionally include any suitable mapping of services, subscribers, IP addresses of components, supported protocols, domains, sub-domains, SSL certificates, component usage breakdown, component combinations, component use sequences, related services, and/or any suitable aspect of network communication to assign identity to network telemetry.

The management module 40 preferably utilizes the map module 50 in coordination with the flow telemetry 44 to determine at any time how much traffic is being driven by one type of service through the cloud system 12. Accordingly, a user of the management module 40 might find that relatively high levels of a service are being driven by a particular CDN 22, in which case the CDN 22 might seek to increase its pricing to reflect the larger demand. Conversely, a user of the management module 40 could determine that another CDN 22 has relatively little traffic, which in turn might inspire a content provider 18 or a content server 24 to use that CDN 22 for increased transmissibility and increased marginal profit on the used bandwidth. Additionally or alternatively, the management module 40 may utilize the map module 50 to provide additional insights into network traffic such as subscriber counts, subscriber patterns, service breakdowns, and/or any suitable traffic analytics. Those of skill in the art will appreciate that the management module 40 would be valuable for any number of players within the system 10, as the management module 40 preferably provides current and precise indications of to what extent and by whom cloud resources are being utilized, which permits increased economic transparency and pricing within the entire system 10. In particular, carriers and enterprise users can use the management module 40 of the preferred embodiment to maximize the use and profitability of their respective cloud resources in the system 10.

2. Methods of the Preferred Embodiment

Figure 4:
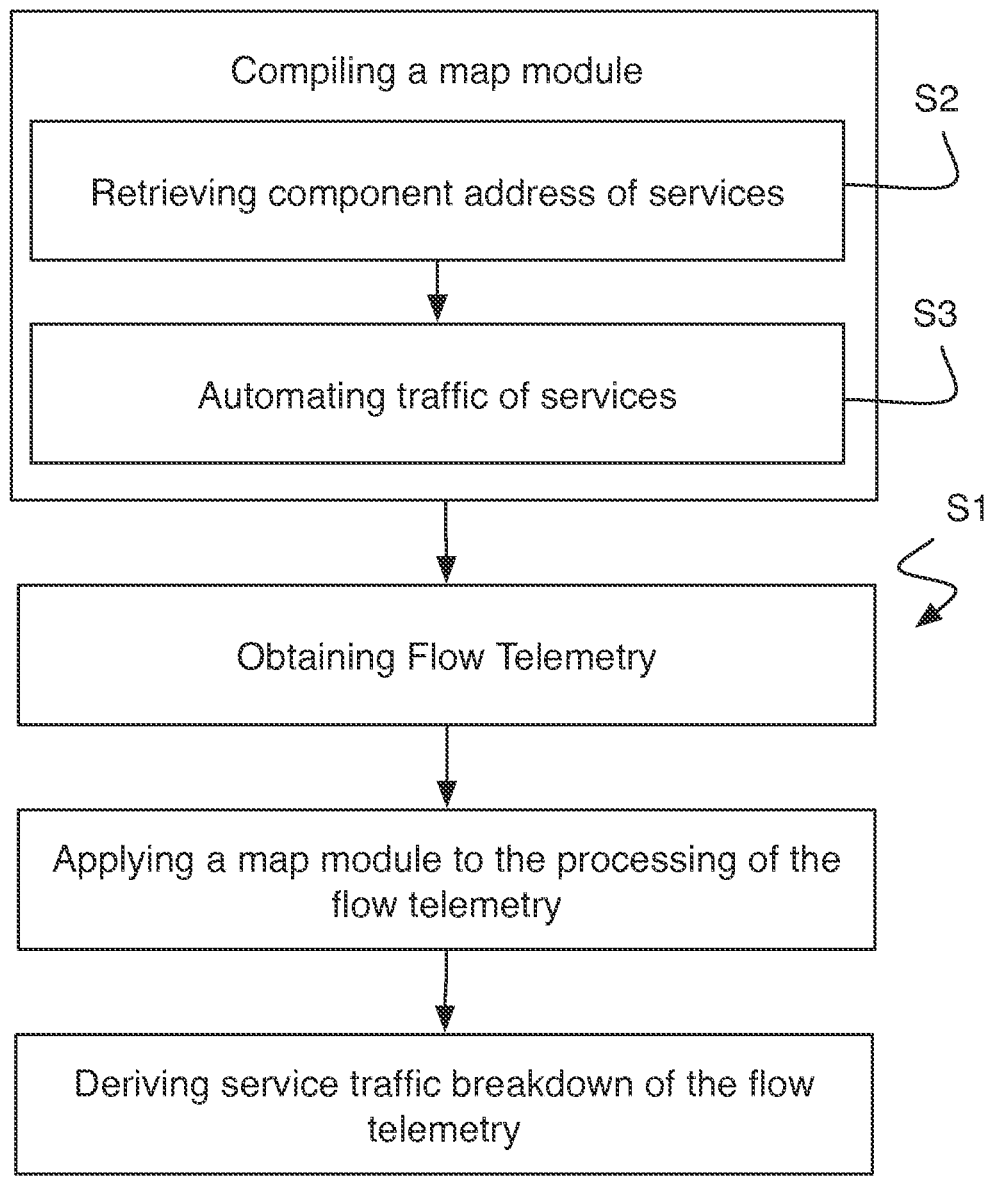
FIG. 4 is a flowchart depicting a method for management of cloud-based systems according to a preferred embodiment of the present invention.

As shown in FIG. 4, methods of a preferred embodiment can include compiling a map module by retrieving component addresses of services and automating traffic of services, obtaining flow telemetry, applying a map module to the processing of the flow telemetry, deriving service traffic breakdown of the flow telemetry, and rendering data in an analytic interface. The method functions to measure use of a cloud infrastructure based on the traffic to or from components (e.g., servers, CDN servers, other IP addressable resources), the combination of components used, the proportional usage of components, indicators of unidentified traffic, and/or any suitable patterns or network use. The method can further use the signaling plane of the internet to identify and classify traffic in the data plane. For example, use DNS queries of a subscriber (i.e., data in the signaling plane) to determine the service used in data network communication. In one aspect, a method of a preferred embodiment converts network information and actively probes services to create a map module that characterizes the relationships between component use and related entities (e.g., subscriber and services). In another aspect, a method of a preferred embodiment leverages the map module to process traffic of a network. A method of a preferred embodiment can provide insight into the usage of the network, despite modern service providers relying on infrastructures that are distributed across various cloud and Internet components.

Figure 5:
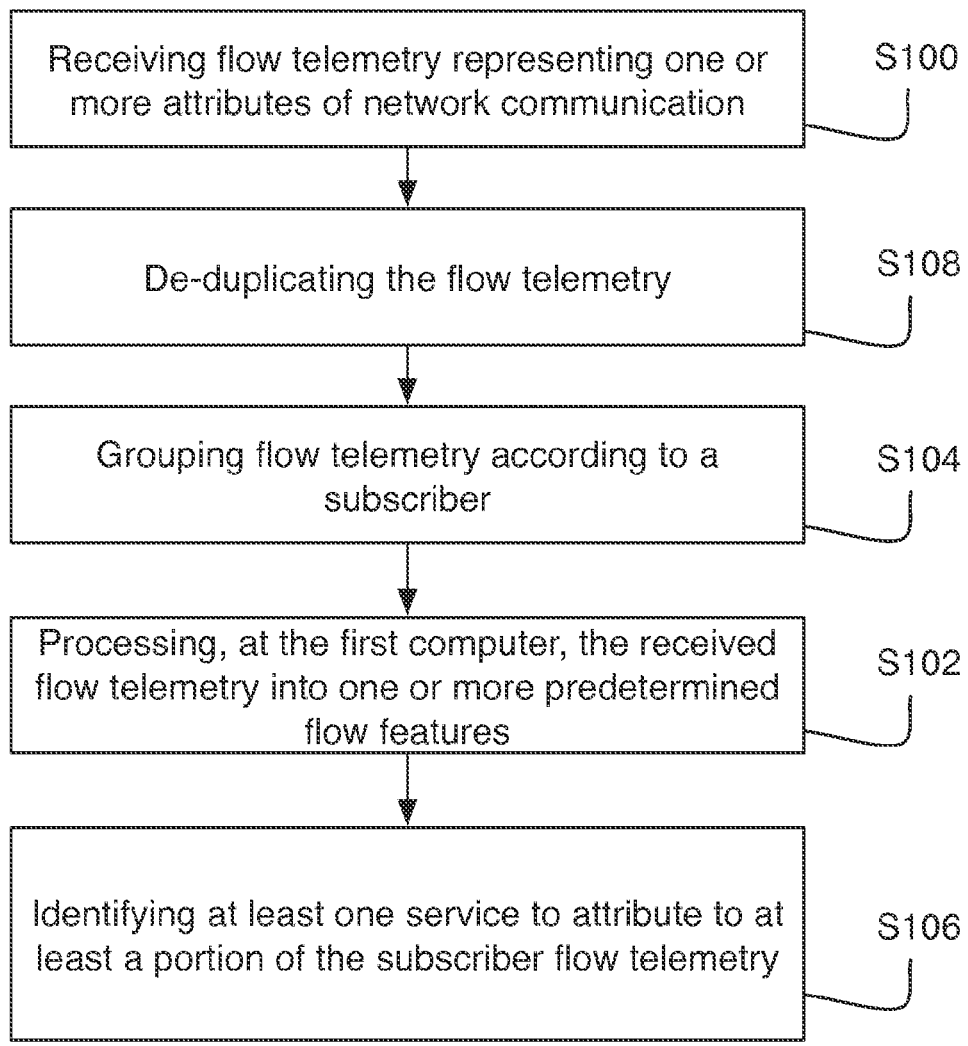
FIG. 5 is a flowchart depicting a method for management of cloud-based systems according to another preferred embodiment of the present invention.

As shown in FIG. 5, a first method of the preferred embodiment can include receiving, at a first computer, a flow telemetry representing one or more attributes of network communication in block S100; and processing, at the first computer, the received flow telemetry into one or more flow features at block S102. The first method of the preferred embodiment can further include grouping, at the first computer, the flow telemetry according to a subscriber in block S104; and identifying, at a first computer, at least one service to attribute to at least a portion of the subscriber flow telemetry in block S106. In isolating flow telemetry of each subscriber, traffic can be processed according to traffic patterns of a subscriber accessing a service or services. The first method of the preferred embodiment preferably functions to identify the types and/or sources of traffic being routed in and out of a computer network, i.e. a cloud-based network, such that a user (e.g., network operator) can determine how and/or to what extent its resources are being consumed by one or more services/subscribers/entities. Additionally, the method of the first preferred embodiment can function to identify one or more services that are causing the traffic within the network, again permitting a user to determine how and/or to what extent its resources are being consumed by one or more services (some of which can be provided by the one or more entities).

As shown in FIG. 5, a first method S1 of the preferred embodiment can include block S100, which recites receiving, at a first computer, a flow telemetry representing one or more attributes of network communication. Block S100 preferably functions to passively and/or actively capture, retrieve, input, and/or receive network telemetry indicative of and/or representing one or more attributes of a communication. As an example, routers and switches regularly export flow telemetry, which can include header information about the packets being forwarded. Preferably, the header information is exported using one or more known protocols (e.g., NetFlow or IPFIX). The routers and/or switches can preferably be configured to export flow information for some or all traffic. More preferably, the routers and/or switches can be configured to export flow information at a predetermined rate, such as, for example, one out of every 1000 flows contain the telemetry receivable in block S100 of the first method of the preferred embodiment. Preferably, the first computer can include one or more computers configured for receiving and processing the flow telemetry in accordance with the first method of the preferred embodiment. The first computer can be configured as a server, server cluster, distributed network of servers, or any other suitable combination of computing devices configured to execute machine-based instructions in response to an input.

As shown in FIG. 5, the first method of the preferred embodiment can additionally include block S102, which recites processing, at the first computer, the received flow telemetry into one or more predetermined flow features. Block S102 preferably functions to organize, categorize, administer, partition, and/or process the received flow telemetry according to one or more predetermined aspects and/or features of a map of the type described herein. The flow features are preferably determined for sub-portions of the received flow telemetry. For example, every use of a service by a subscriber preferably will have at least one flow feature determined so as to map that portion of flow telemetry (i.e., the traffic related to the subscriber's use of the service) to the service. The flow telemetry is preferably processed according to components involved in sub-portions of the flow telemetry. The components are typically referenced by IP address but any suitable component addressing protocol may alternatively be used. Processing the flow telemetry will typically involve identifying features, patterns, or characteristics that, through the network map module, can be correlated with preferably one entity (e.g., a service and/or subscriber) or alternatively a set of entities. As an example, the map module described above can include a correlation between an IP address and the type of endpoint associated with the IP address, such as, for example, whether the IP address is associated with a server or a subscriber. In some variations, the flow feature(s) may not be able to uniquely correlate a portion of the flow telemetry with a single service, and a plurality of possible services will be attributed to that portion of the flow telemetry. Accordingly, preferably block S102 functions to process the flow telemetry into two or more predetermined categories of communication based upon whether the flow telemetry indicates that the communication is server-server (machine to machine), server-subscriber (machine to peer), and/or subscriber-subscriber (peer to peer). Additional or alternative categories can preferably be utilized according to the first method of the preferred embodiment as needed and/or desired by the user. Categorizing and segmenting the flow telemetry enables the method to process flow telemetry according to flow features related to network patterns in those categories.

As shown in FIG. 5, a first variation of the first method of the preferred embodiment can include block S108, which recites de-duplicating the flow telemetry at the first computer. Block S108 preferably functions to scrub the flow telemetry of any duplicate, triplicate, and the like information that represents the same network communication and in effect consolidating duplicate flow telemetry. Preferably, block S108 de-duplicates the flow telemetry according to one or more predetermined relationships between two or more individual flow information segments. The predetermined relationships are preferably a function of at least one of time and/or flow tuples. As an example, block S108 preferably selects a single flow (e.g. flow telemetry from measured along one leg of communication) if there are multiple transmissions along the same flow tuple (i.e., src/dst IPs, protocol, src/dst ports). Preferably, each subject flow tuple is measured through predetermined time intervals, such that if repetitive flow information appears on the same flow tuple within a predetermined time interval, only selected or representative flow information (i.e., the first flow information for each tuple) is used in the subsequent processing. Preferably, the predetermined time interval is on the order of minutes or tens of seconds, although any other suitable time interval can be employed subject to the traffic conditions throughout the network.

As shown in FIG. 5, the first method of the preferred embodiment can further include block S104, which recites grouping the flow telemetry at the first computer according to a subscriber. Block S104 preferably functions to categorize, organize, partition, and/or group the flow data into a subcategory according to the subscriber such that further analysis and/or processing can be performed on a per-subscriber basis. The flow telemetry may alternatively be categorized into any suitable groupings. It should be understood that at any given point in the operation of the first method of the preferred embodiment, each block can be performed in parallel resulting in a potentially large number of subscribers. Accordingly, any subscriber-level analysis can include block S106, which recites identifying at least one service at a first computer to attribute to at least a portion of the subscriber flow telemetry, the service identified through the processed flow feature and a flow-mapping, which functions to classify the flow telemetry for each subscriber. Preferably, identifying the flow telemetry for each subscriber functions to classify, characterize, compute, determine, profile, and/or describe one or more network communication aspects of the particular subscriber, including, for example, used service, bandwidth consumption, server consumption, network distribution, and the like. The identification of a service preferably involves looking up in a map module a flow-mapping with a flow-feature of the respective portion of flow telemetry. The flow mapping will preferably map the flow feature to a service. The mapping may alternatively include a plurality of services, a subscriber entity, or any suitable label for the network traffic. Identifying a service may additionally include use of other tables, databases, and/or other resources related to the map module such as a table of sub-domains of a service. Typically a series of network communications between a subscriber and a cloud component will be grouped together according to a shared flow feature of the IP address of the cloud component. All communication to the same IP address can be assumed to be for the same service. If that IP address is included in the map module, a flow-mapping can be looked up from the IP address and the associated service can be identified.

Figure 6:
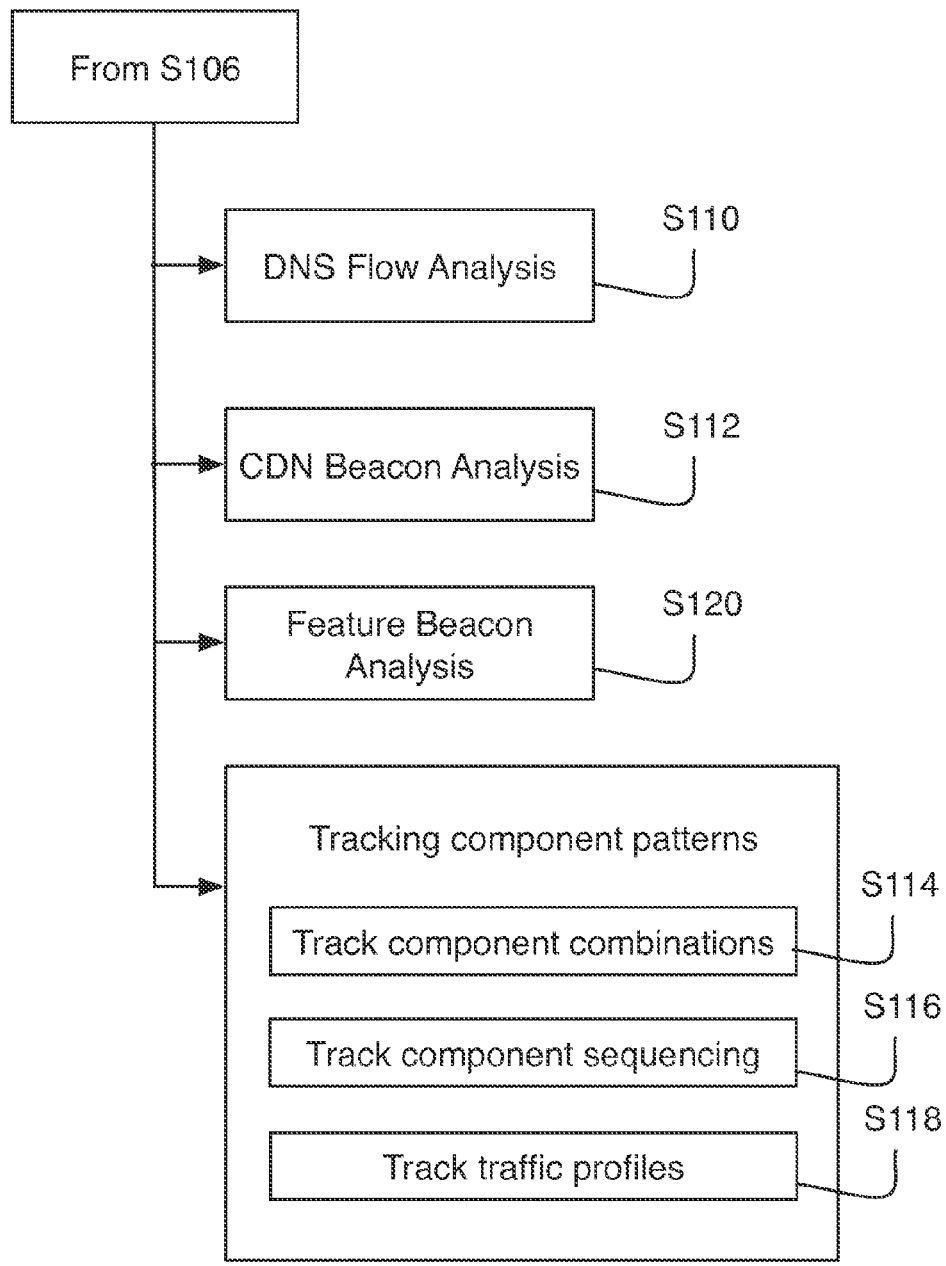
FIG. 6 is a flowchart depicting one or more additional aspects of the method for management of cloud-based systems according to another preferred embodiment of the present invention.

In additional variations of the first method of the preferred embodiment, the classifying the flow telemetry for each subscriber can include one or more of a series of independent techniques or tools in processing/analyzing subscriber flow telemetry. Many of these techniques may involve tracking or detecting combinations of component use to use as a flow feature. As shown in FIG. 6, the first method of the preferred embodiment can additionally include one or more of: analyzing a DNS flow in block S110; generating a CDN beacon in block S112; tracking component combinations in block S114; and/or tracking traffic profiles in block s116. The variations of the first method of the preferred embodiment shown in FIG. 6 preferably function to more precisely and/or specifically categorize or classify flow telemetry for a particular subscriber based at least in part on publicly available and/or readily accessible flow information.

As shown in FIG. 6, a first variation of the first method of the preferred embodiment includes block S110, which recites analyzing a DNS flow. The first variation of the first method of the preferred embodiment can additionally include retrieving DNS flow telemetry, which functions to receive a copy of any recursive responses sent to the subscribers. Recursive responses are typically DNS recursive responses that identify an IP address of a device that corresponds to a domain name. The recursive responses are part of the signaling plane of Internet communication. Preferably, the recursive responses can include both queries and answers, such that an IP address (or other suitable component address) can be determined from the DNS flow. Domain name queries sent from a user or machine are preferably retrieved from a DNS server or through a telemetry interface tapping into communication between the DNS server and the user or machine. Preferably, a history of queries from a subscriber can be matched to answers having the IP address of the server. In addition to tracking the domain name to component address mapping, a DNS flow tracker can facilitate tracking the history of the mapping. The mapping may be substantially static or substantially dynamic. Such properties are preferably characterized into a classification. A DNS based classification may be considered when processing the flow telemetry. For example, dynamic DNS mapping may indicate the related flow telemetry is associated with a CDN or a massive web-hosting infrastructure.

From the retrieved DNS flow telemetry, Block S110 preferably matches recursive responses with the subscribers. The component address can be matched to a domain name, and the domain name can be mapped to a service. Data and signaling flow telemetry are preferably matched based on temporal locality and/or corresponding IP addresses. In an exemplary scenario, a device initiates a DNS request for example.com and receives a response specifying an IP address of 192.0.2.1. Then data network traffic to 192.0.2.1 within 1 minute the user can be correlated with a service that uses the domain example.com. The map module described herein can include a mapping of domains to services. As an example, hulu.com can be mapped to both hulu.com and hulufs.fplive.net, while netflix.com can be mapped to netflix.com as well as nflximg.com. The domain name to IP address mappings may additionally be added to the map through operation of the method. As mentioned above, the DNS flow may be used in classifying the type of flow telemetry (e.g., traffic to components with dynamic or static DNS records). Block S110 therefore preferably functions to identify particular services based upon DNS flow between one or more servers that conduct the service and a subscriber.

As shown in FIG. 6, a second variation of the first method of the preferred embodiment includes block S112, which recites generating a CDN beacon. Block S112 preferably functions to correlate a server location and/or CDN property with a provider of the service hosted on the server. Preferably, block S112 can include tracking a locality of content at a group of CDNs (e.g., some servers within the CDN are dedicated to a particular service provider such as Facebook while others can be split between four or five other large customers.) The tracked locality of CDN content is preferably added to the map module to serve as an additional flow feature. The map preferably correlates CDN components to a service or services. For example, the map module may map a first CDN server with a service A, and map a second CDN server to service B and service C. The mapping of the second CDN server may additionally include characterization of the breakdown service B and service C (e.g., 30% and 70% use of the CDN service). Tracking the locality of the CDN content preferably permits a probabilistic determination of server identity as there are only so many servers associated with a particular CDN, from which some probability of ownership can be readily inferred. Additionally or alternatively, block S112 can preferably include tracking an address space of a known service (e.g., Facebook) if and when it is known. Once a server or IP address is associated with a particular service, block S112 preferably further includes searching for known service traffic (i.e., traffic that is going to a known IP or dedicated CDN server), and then assigning the located traffic to the known service provider channel. As described below, traffic to shared CDN servers can be mapped to a service based on traffic to a CDN server of the known service. Preferably, block S112 can additionally include generating a profile of the traffic on the known channel, wherein the profile can include, for example, shared components that are used to communicate with the known IP address or dedicated CDN server. Accordingly, any other traffic that appears in the network that shares the same component profile can be assigned to the same service provider.

As shown in FIG. 6, a third variation of the first method of the preferred embodiment can include block S114, which recites tracking component combinations. As noted above, various Internet services are not monolithic, but rather they are built using a combination of shared and reusable components. Components can include, for example, compute clouds (Amazon EC2), CDNs (Akamai, Limelight), hosting providers (Rackspace), advertising solutions (advertising.com, Google Adsense), and analytics providers (Google Analytics, Adobe Omniture), as well as a host of other components found in web services. As noted with respect to block S112 and block 120 below, a known IP address or CDN server can preferably function as a beacon or template to which similar and/or identical traffic can be identified. However, even if there is no dedicated beacon, block S114 preferably can function to infer a service provider from a tracked combination or sub-combination of components. For example, if a subscriber uses components A, B, and C in a short time interval, and it is known that Facebook uses those components, then block S114 preferably functions to assign the traffic to Facebook in response to its component signature. The component combinations may include patterns of component make up, proportions of component use, sequence order of component use, timing of components, types of traffic to a component, or any suitable component use patterns. Preferably, a non-unique or ambiguous component signature can be resolved in combination with any other variation of the first method of the preferred embodiment shown in FIG. 6.

As shown in FIG. 6, a fourth variation of the first method of the preferred embodiment can include block S116, which recites tracking component timing characteristics. Tracking timing characteristics preferably involve tracking timing and/or sequence ordering of combinations of components, and using that temporal pattern of component combinations as a flow feature. Block S116 preferably functions to identify and/or assist in identifying a service provider in response to a temporal usage and/or ordering of two or more components tracked in block S114. Preferably, if the list of components used is not uniquely associated with a service, then an ordering or temporal usage of the components can either be associated with a unique service provider or further eliminate additional service providers, i.e., even if the component ordering is not unique to a single service provider, it can be used in the process of eliminating those candidates that do not share the same temporal profile.

As shown in FIG. 6, a fifth variation of the first method of the preferred embodiment can include block S118, which recites tracking traffic profiles in the network. Block S118 preferably functions to characterize, describe and/or infer a service provider source of network traffic based at least in part on the rate and/or profile of the communications. As an example, video services, gaming services, web browsing, peer-to-peer communications and the like all have distinct traffic patterns. Accordingly, block S118 can function, alone or in combination with other variations shown in FIG. 6, to identify and/or characterize the service that is consuming the network services. Alternatively, the type of service (e.g., video streaming, browsing, audio streaming, gaming, peer-to-peer, etc.) of the flow can be useful analytical information even if a single service cannot be attributed with the traffic.

As shown in FIG. 6, another variation of the method of the preferred embodiment can include using flow features of a first portion of flow telemetry to assign flow features of a second portion of flow telemetry S120, which functions to use flow features that are strong indicators as beacons/triggers to treat related flow telemetry in a similar manner. Typically the first portion of flow telemetry will have a flow feature that is substantially definite in the characterization. For example, communication to an IP address of a known server of Facebook has a high, if not ensured, probability of being Facebook related traffic. The second portion of flow telemetry is preferably related to the first portion of flow telemetry. The second portion may be related to the first portion through the subscriber, timing, traffic characteristics, or any other means. However, the second portion of flow telemetry will typically be unable to receive a definite flow feature, either because no flow feature matches can be generated for that portion or the component may be a shared component (e.g., a shared CDN server). As the portions are related, the high probability of one portion can act as a strong indicator that the related second portion of flow telemetry is also for the same service. For example, flow telemetry of a subscriber may include substantially simultaneous traffic to one CDN server of Facebook and traffic to a shared CDN server used by Facebook, Youtube, and Hulu. While, the traffic to the shared CDN server could be for either of those services, the traffic to the Facebook CDN server can serve as a strong indicator that traffic to the shared CDN server is also Facebook. Thus, the traffic to the Facebook CDN server acts as a beacon.

Each of the variations of the first method of the preferred embodiment can be used alone or in any suitable combination. Moreover, any combination of the variations of the first method of the preferred embodiment can be used in a parallel or serial manner, or in any suitable combination of parallel or serial architecture, depending upon the network being analyzed, the variation among network services, or any other desired criteria. As noted above, the first method of the preferred embodiment can interact with and/or include a map module or map function, which is described in detail below in the second method of the preferred embodiment.

Figure 7:
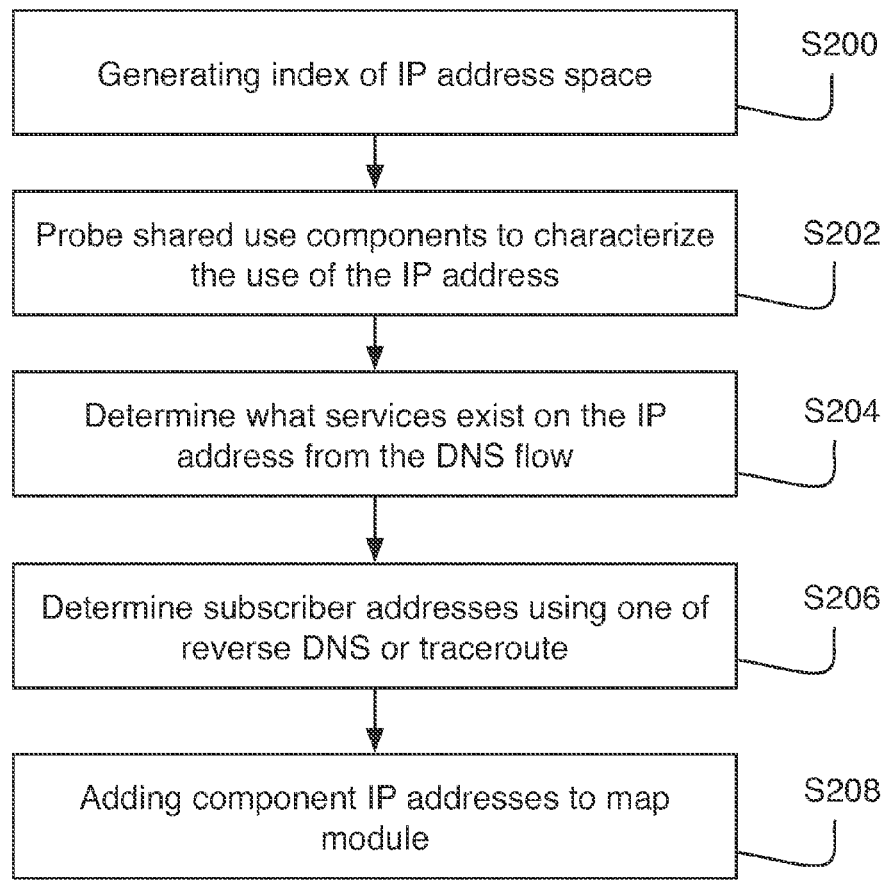
FIG. 7 is a flowchart depicting one or more additional aspects of the method for management of cloud-based systems according to another preferred embodiment of the present invention.

As shown in FIG. 7, a second method S2 of the preferred embodiment can include generating an index of IP address space in block S200; probing shared use components to characterize the use of an IP address in block S202; and determining what services exist on the IP address from the DNS flow in block S204. Additionally, the second method of the preferred embodiment can include determining subscriber addresses using one of reverse DNS or traceroute in block S206; and adding components to a map module in block S208. The second method of the preferred embodiment preferably functions to identify and associate IP addresses with types of users, such as subscribers and services. Moreover, the second method of the preferred embodiment preferably functions to populate and/or create an index or map of IP address space based at least in part on various publically available Internet control and signaling protocols and/or databases retrieved by the system. The second method preferably contributes to a map module composed of flow features; the flow features will characterize the relationship between an IP address with at least one service and/or subscriber. Performance of the first method of the preferred embodiment may additionally facilitate operation of the second method of the preferred embodiment through processing of the flow telemetry, in particular in receiving the DNS recursive responses. The second method (and the third method) preferably complete at least a partial map module prior to starting the first method, but the map may be built or continuously built at any suitable time.

As shown in FIG. 7, the second method of the preferred embodiment includes block S200, which recites generating an index of IP address space. Block S200 preferably functions to discover, receive, retrieve, list, and/or compile various owners of IP address space. Preferably, block S200 functions in part using one or more public resources, such as Border Gateway Protocol (BGP) and/or Internet registries containing listings of IP addresses. The second method of the preferred embodiment can further utilize any other resource or combination of resources, whether public or private, to compile and/or generate the index of IP addresses for the map module.

As shown in FIG. 7, the second method of the preferred embodiment can further include block S202, which recites probing shared use components to characterize the use of the IP address. Block S202 preferably functions to actively and/or passively identify an actual or potential use of any IP address by analyzing any shared use components (CDN, compute) associated with that IP address. Preferably, block S202 can include determining one or more protocols that are available on the server associated with the IP address, i.e., Flash, HTTP, HTTPS, and the like, that may be indicative of a use of the IP address. Additionally, block S202 can preferably include checking for any available SSL certificates associated with the IP address, which again may be indicative of the use of the IP address. Block S202 can also preferably include performing one or more reverse DNS probes to determine a domain name associated with the IP address, from which the service(s) associated with the IP address may be inferred. Block S202 can perform any one or more of the foregoing processes in probing the shared use components associated with the IP address in any suitable combination or sub-combination, and in serial or in parallel for each or any IP address under examination.

As shown in FIG. 7, the second method of the preferred embodiment can include block S204, which recites determining what services exist on the IP address from the DNS flow. Block S204 preferably functions to categorize, characterize, deduce, infer, and/or identify services associated with the IP address in response to an examination of the DNS flow associated with the IP address. As noted above, hulu.com can be mapped to both hulu.com and hulufs.fplive.net, while netflix.com can be mapped to netflix.com as well as nflximg.com, all of which provide streaming video services, but from different (competitive) service providers. Block S204 therefore preferably functions to identify particular services based upon DNS flow between one or more servers that conduct the service and a subscriber.

As shown in FIG. 7, the second method of the preferred embodiment can include block S206, which recites determining subscriber addresses using one of reverse DNS or traceroute. Block S206 preferably functions to categorize, characterize, deduce, infer, and/or identify a subscriber associated with the IP address in response to a reverse DNS/traceroute operation. As described above, block S204 preferably functions to identify a service associated with an IP address, which can include server-based network communications, i.e., hulufs.fplive.net, to a subscriber. Block S206 preferably performs substantially the same function as block S204, but for subscriber-based network communications, i.e., peer-to-peer communications that might not use a large third-party service. Accordingly, block S206 preferably functions to identify the subscribers (as opposed to the servers/services) in the network, which information can in turn be used as described below in populating the index of the IP address space.

As shown in FIG. 7, the second method of the preferred embodiment can further include block S208, which recites adding components to a map module, specifically, the IP address space mapped into the map module. Block S208 preferably functions to compile, describe, populate, and/or integrate identified services and subscribers (from blocks S204 and S206) into a map module that can be used in one or more additional aspects of the methods of the preferred embodiment. As an example, the map generated in block S208 is preferably usable in the first method of the preferred embodiment, such as in classifying the flows for each subscriber. Preferably, the generated map is continuously or quasi-continuously updated through repeated performance of the second method of the preferred embodiment.

Figure 8:
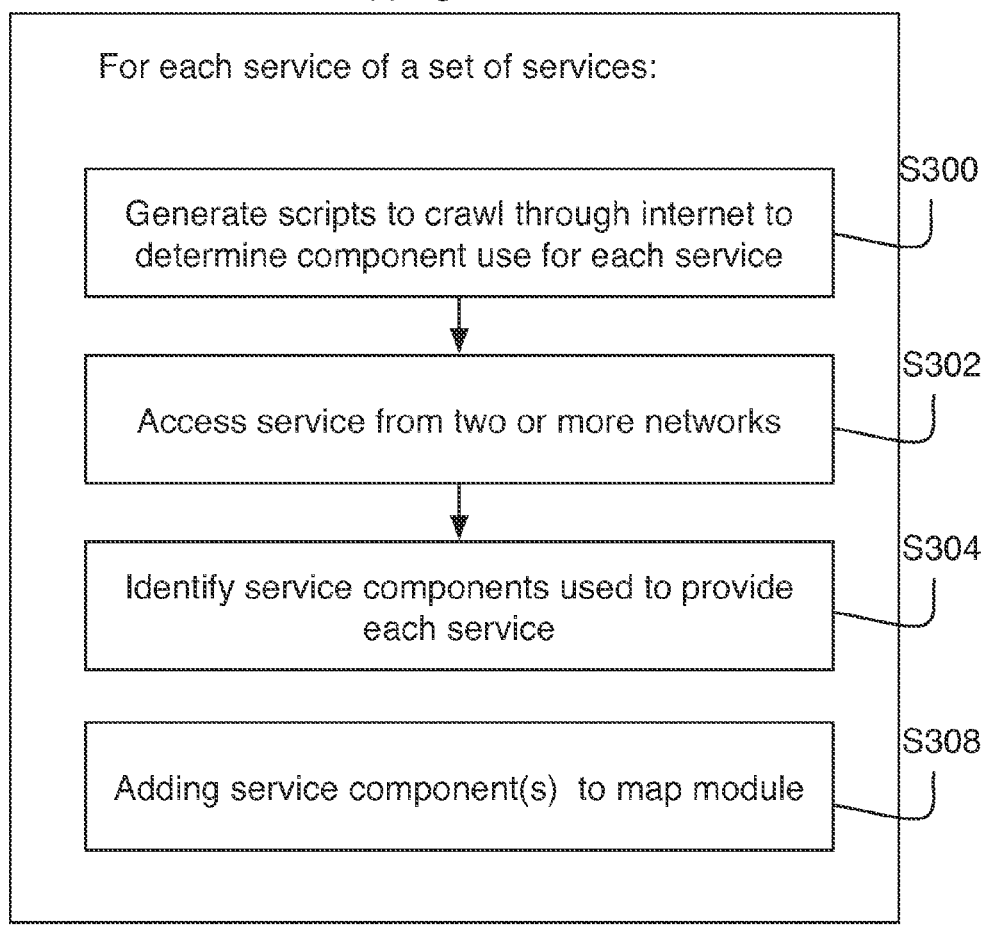
FIG. 8 is a flowchart depicting one or more additional aspects of the method for management of cloud-based systems according to another preferred embodiment of the present invention.

As shown in FIG. 8, a third method S3 of the preferred embodiment can include generating scripts to crawl through the Internet to determine a component use for each service in block S300; accessing each service independently from two or more networks in block S302; identifying service components used to provide each service in block S304; and adding service components to a map module S308. The third method of the preferred embodiment preferably functions to categorize, characterize, deduce, infer, and/or identify a component associated with a service IP address. The third method preferably works in a complimentary way to the second method in building the map module/function. While the second method in one aspect works from IP addresses to an entity or label, the third method uses automation to work from service usage to IP addresses. Method S3 works to automate traffic of a service and add contributing to a map module based on monitored service traffic. The automated service traffic is preferably performed for each service from a set of services. Preferably, identification of the service components associated with any or each service can be used by the first and/or second methods of the preferred embodiment in determining an identity of the service provider in response to the profile/signature of the components in use at the particular IP address. Services targeted by the third method are typically high profile services, but any suitable service may be targeted. As infrastructure of services can change over time, services may be routinely updated.

As shown in FIG. 8, the third method of the preferred embodiment can include block S300, which recites generating scripts to crawl through the Internet to determine a component use for each service. Block S300 preferably functions to automatically interact with a plurality of service providers in order to determine a quantity, ordering, and identity of various components used by the service providers. The access of the services is preferably synchronized with identifying service components. Block S300 preferably includes at a first client simulating traffic of a first service. Preferably, the scripts crawl through a large number of websites watching videos, downloading files, or any other suitable activity, in order to ascertain whether and to what extent the website is employing components to distribute its content. Preferably, the scripts are configured to readily identify and report the identity of the IP address, the service being provided, the name(s) of the component(s), the sequencing of the components (if any), or any other suitable information that can be used to identify the service by its component profile. Preferably, the third method of the preferred embodiment can generate any number of scripts, which can be of any suitable length, format, and/or configuration for interacting with one or more types of websites and/or content available on websites. In an alternative embodiment, the crawling of websites may be real-life service use, but a plug-in or application module preferably monitors the service access and synchronizes with the identification of service components.

As shown in FIG. 8, the third method of the preferred embodiment can further include block S302, which recites accessing each service independently from two or more networks. Block S302 preferably functions to ensure the discovery and/or identification of any and all components associated with an IP address by using different networks to access the same content. One or more services can have differing component profiles in response to what kind of network is accessing the server associated with the IP address. Accordingly, block S302 preferably uses two or more (or any suitable or necessary number) network types to access each IP address being examined such that a complete profile of the components in use is presented to the third method of the preferred embodiment. For example, block S302 can include accessing the IP address through a DNS resolver and a VPN, a distributed automation system, or other techniques to the run the script from diverse network/Internet locations, which may cause a different component profile to be assembled at the same IP address. Any other suitable networking protocols can be used in combination with or in lieu of the example networks noted in order to obtain a complete description of the components used with each service being examined.

As shown in FIG. 8, the third method of the preferred embodiment can further include block S304, which recites identifying service components used to provide each service. Block S304 preferably functions to aggregate, categorize, classify, assemble, and/or populate the map module with a component profile for each service being examined. The identification of the service components is preferably coordinated with the operation of a generated script. As the script runs, flow telemetry from that client device can be monitored to identify what components are accessed. For example, by visiting a Youtube page and playing the video, the accessed Youtube servers and outside components can be used to generate a profile of Youtube video watching. The flow telemetry patterns described above can be characterized into flow features with a correlation to the test service. Preferably, the portion of the map that correlates component profiles to types of services can be used in the first method of the preferred embodiment described above. So when flow telemetry is encountered with a similar profile as the profile generated when the script played a Youtube video, Youtube can be identified as the responsible service. As an example, one variation of the first method of the preferred embodiment includes block S114, which recites tracking component combinations. As noted above, various Internet services are not monolithic, but rather they are built using a combination of shared and reusable components. Components can include, for example, compute clouds (Amazon EC2), CDNs (Akamai, Limelight), hosting providers (Rackspace), advertising solutions (advertising.com, Google Adsense), and analytics providers (Google Analytics, Adobe Omniture), as well as a host of other components found in web services. A component profile generated in accordance with the third method of the preferred embodiment can be readily implemented in the first method of the preferred embodiment in identifying the network traffic within the cloud-based environment.

As shown in FIG. 8, the third method of the preferred embodiment can further include block S308, which recites adding a service component to a map module. Block S308 may be substantially similar to block S208 in that block S208 and S308 use obtained information to contribute to a mapping module. In the map module, Block S308 may add flow-mappings of IP address flow features mapped to a service, similar to S208. Block S308 (and similarly Block S208) may alternatively characterize any suitable flow feature such as component patterns, shared CDN components, or contribute any suitable information used in the map module.

3. Preferred Example User Interface

Figure 9:
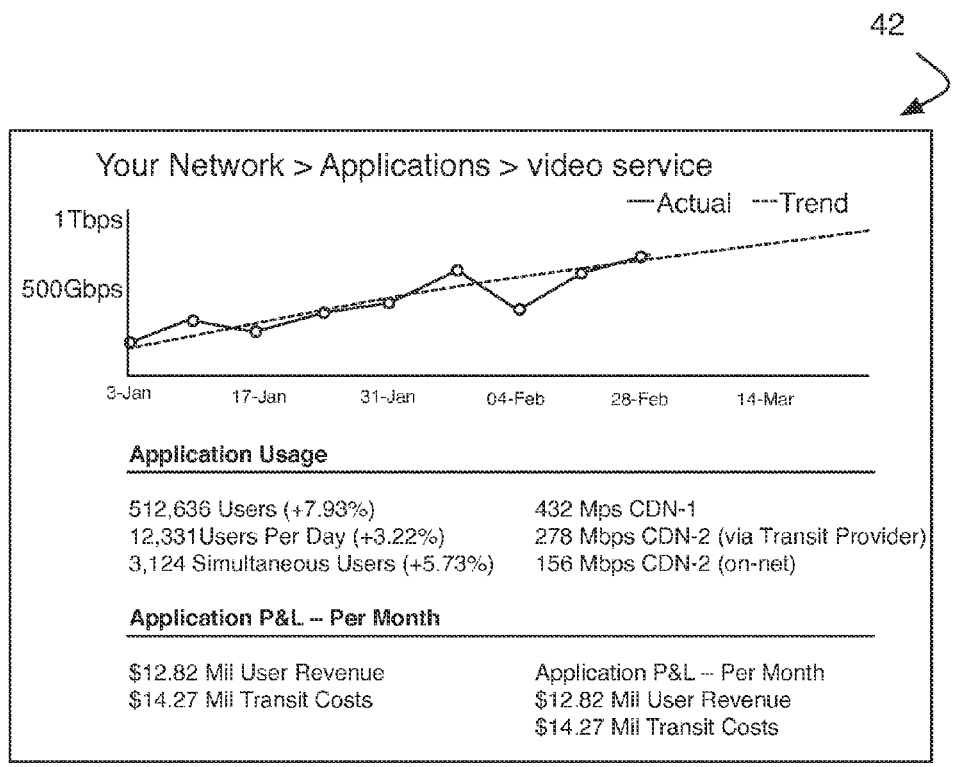
FIG. 9 is a sample screenshot from one example implementation of the system and/or method for management of cloud-based systems according to the preferred embodiments of the present invention.
Figure 10:
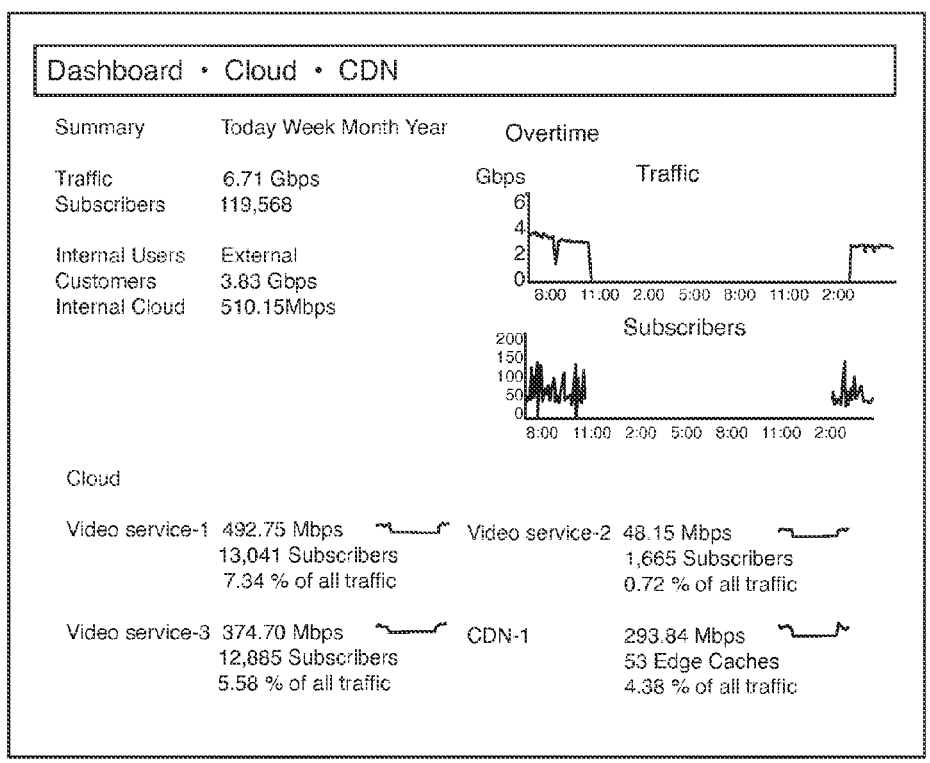
FIG. 10 is a sample screenshot from one example implementation of the system and/or method for management of cloud-based systems according to the preferred embodiments of the present invention.

As shown in FIGS. 9 and 10, an example service analytics interface 42 in accordance with the system 1o and methods of the preferred embodiment can include a graphical and textual representation of network data, resource use and profitability for a user. The system 10 is preferably configured for compiling data on services of flow telemetry; and rendering the data in service analytics interface 42. The service analytics interface 42 is preferably a user interface but may alternatively be a database interface accessible through an API or other means. FIG. 9 illustrates an example analytics interface 42 for a particular application, while FIG. 10 illustrates an example analytics interface 42 at a higher level, including multiple applications. As shown in FIG. 9, the graph on top shows the increased usage of an application (Netflix) in a user's network. As shown, over the selected time period of two months, the application usage increases approximately threefold, from 250 GBps to approximately 750 GBps. The top textual portion of the example analytics interface 42 breaks down the application usage and percentage change by number of users and traffic amounts and paths through the cloud. The bottom textual portion of the example analytics interface 42 summarizes the profitability of the application on a monthly basis relative to the users, the application provider, and the costs of transiting the content through the cloud.

As shown in FIG. 10, another example analytics interface 42 can include a dashboard illustrating snapshot data relating to a network at large. As shown in the top left of the example analytics interface 42, the summary of the network can show overall network traffic (6.71 GBps) and a number of subscribers (119,568). Additionally, the example dashboard can distinguish between internal and external users, as well as provide historical and/or average user or data statistics for a selected time period. As noted above, the system and methods of the preferred embodiment can be used for generating network intelligence to more properly allocate and price network resources. Accordingly, the example analytics interface 42 can include a listing or chart of one or more applications or aspects within the system 10 along with the respective data use, number of subscribers, and allocation of all traffic for the user's network. In the example screenshot shown in FIG. 10, Netflix and Youtube video services have the largest number of subscribers and data usage as compared to Hulu. A CDN, Akamai, is shown as moving a relatively large amount of data (on par with Netflix and Youtube) through its edge caches. It should be apparent to those of skill in the art that the example screenshots depicted in FIGS. 9 and 10 are for illustrative purposes only, and that any other suitable metric could readily be incorporated into the relevant display in addition to or in lieu of those described above.

The method of the preferred embodiment and variations thereof can be performed by a system and/or a computer program product embodied in a computer-readable medium storing computer-readable instructions. The system 10 can include one or more networked devices configured for the receipt and transmission of traffic and/or map data to a user as well as one or more cloud-based systems and subsystems. Any computer readable instructions are preferably executed by computer-executable components integrated with one or more of a management module, data center, server cluster, or a server. Any computer readable instructions can be locally stored and/or accessed or remotely stored and/or accessed through a cloud-based system of the type described herein. The computer-readable medium can be stored on any suitable computer readable media such as RAMs, ROMs, flash memory, EEPROMs, optical devices (CD or DVD), hard drives, floppy drives, or any suitable device, combination of devices, or distributed network of devices. The computer-executable component is preferably a processor but any suitable dedicated hardware device can (alternatively or additionally) execute the instructions.

Although omitted for conciseness, the preferred embodiments include every combination and permutation of the various systems and methods. As a person skilled in the art will recognize from the previous detailed description and from the figures and claims, modifications and changes can be made to the preferred embodiments of the invention without departing from the scope of this invention defined in the following claims.

What is claimed is:

1. A method for reporting usage of a network infrastructure comprising:
   performing by one or more computers:
      obtaining a map of a plurality of flow-mappings that each correlates a flow feature with an endpoint type, wherein the endpoint type is a subscriber or a service, wherein a first flow-mapping includes a content delivery network (CDN) component as a flow feature that correlates to a first service, and a second flow-mapping includes a shared CDN component as a flow feature that correlates to at least the first and a second service;

receiving flow telemetry comprising a plurality of destination and source attributes for network traffic of a network infrastructure;

categorizing the flow telemetry into one or more subscriber flows using the map;

selecting the subscriber flow of a subscriber;

attributing at least one of the services to at least a portion of the selected subscriber flow:

identifying the first service to attribute to a first portion of selected subscriber flow; and if a second portion of the subscriber flow is associated with the first portion of subscriber flow telemetry, identifying the first service to attribute to the second portion of the subscriber flow telemetry.

2. The method of claim 1, wherein the map includes at least one flow-mapping that correlates a domain name to a service and wherein categorizing the flow telemetry comprises:

identifying domain name service (DNS) recursive responses sent to the subscriber in the flow telemetry, a recursive response including at least a domain name query and component address; and identifying a third portion of the flow telemetry from the subscriber to the component address.

3. The method of claim 2, wherein attributing at least one of the services to at least a portion of the selected subscriber flow comprises:

identifying a service for the third portion of flow telemetry that correlates a domain name of the component address to a service in the selected subscriber flow.

4. The method of claim 1, wherein attributing at least one of the services to the selected subscriber flow telemetry comprises:

tracking combinations of component use as a flow feature.

5. The method of claim 4, wherein possible services are limited through one flow feature and a flow-mapping.

6. The method of claim 4, wherein tracking combinations of component use comprises:

tracking substantially simultaneous component usage by the subscriber, and wherein the identified service is identified through a flow-mapping correlating at least two components of simultaneous usage to a service.

7. The method of claim 4, wherein tracking combinations of component use comprises:

tracking a sequence of component usage by the subscriber, and wherein the identified service is identified through a flow-mapping correlating a sequence of at least two components to a service.

8. The method of claim 4, wherein tracking combinations of component use comprises:

tracking proportions of component usage the subscriber, and wherein the identified service is identified through a flow-mapping correlating a usage proportion ranges of at least two components to a service.

9. The method of claim 4, wherein tracking combinations of component use comprises:

tracking a traffic profile of a component accessed by the subscriber, and limiting possible identified services to services correlated with flow feature of the traffic profile.

10. The method of claim 1, further comprising:

compiling data on services attributed to portions of the flow telemetry; and rendering the data in service analytics interface.

11. The method of claim 10, wherein obtaining a map comprises:

retrieving component addresses of services, and adding the component addresses to the map as flow features correlated to a service, and at a first client, automating traffic of a first service and adding service components identified in traffic of the first client as flow features correlated to the first service in the map.

12. The method of claim 1, wherein a particular flow feature in the map is one or more Internet Protocol (IP) addresses.

13. The method of claim 1, further comprising:

consolidating duplicate flow telemetry of the subscriber.

14. A system comprising:

one or more computers programmed to perform operations comprising:

obtaining a map of a plurality of flow-mappings that each correlates a flow feature with an endpoint type, wherein the endpoint type is a subscriber or a service, wherein a first flow-mapping includes a content delivery network (CDN) component as a flow feature that correlates to a first service, and a second flow-mapping includes a shared CDN component as a flow feature that correlates to at least the first and a second service;

receiving flow telemetry comprising a plurality of destination and source attributes for network traffic of a network infrastructure;

categorizing the flow telemetry into one or more subscriber flows using the map;

selecting the subscriber flow of a subscriber;

attributing at least one of the services to at least a portion of the selected subscriber flow:

identifying the first service to attribute to a first portion of selected subscriber flow; and if a second portion of the subscriber flow is associated with the first portion of subscriber flow telemetry, identifying the first service to attribute to the second portion of the subscriber flow telemetry.

15. The system of claim 14, wherein the map includes at least one flow-mapping that correlates a domain name to a service and wherein categorizing the flow telemetry comprises:

identifying domain name service (DNS) recursive responses sent to the subscriber in the flow telemetry, a recursive response including at least a domain name query and component address; and identifying a third portion of the flow telemetry from the subscriber to the component address.

16. The system of claim 15, wherein attributing at least one of the services to at least a portion of the selected subscriber flow comprises:

identifying a service for the third portion of flow telemetry that correlates a domain name of the component address to a service in the selected subscriber flow.

17. The system of claim 14, wherein attributing at least one of the services to the selected subscriber flow telemetry comprises:

tracking combinations of component use as a flow feature.

18. The system of claim 17, wherein possible services are limited through one flow feature and a flow-mapping.

19. The system of claim 17, wherein tracking combinations of component use comprises:

tracking substantially simultaneous component usage by the subscriber, and wherein the identified service is identified through a flow-mapping correlating at least two components of simultaneous usage to a service.

20. The system of claim 17, wherein tracking combinations of component use comprises:

tracking a sequence of component usage by the subscriber, and wherein the identified service is identified through a flow-mapping correlating a sequence of at least two components to a service.

\* \* \* \* \*

UNITED STATES PATENT AND TRADEMARK OFFICE
CERTIFICATE OF CORRECTION

| | | |
|---|---|---|
| PATENT NO. | : 9,680,757 B2 | Page 1 of 1 |
| APPLICATION NO. | : 14/922737 | |
| DATED | : June 13, 2017 | |
| INVENTOR(S) | : Joseph E. Eggleston et al. | |

It is certified that error appears in the above-identified patent and that said Letters Patent is hereby corrected as shown below:

On the Title Page

Patent is hereby amended to list the Applicant (71), as follows:
(71) Applicant: Deepfield Networks Inc., Ann Arbor, MI (US)

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*